(12) United States Patent
Lecomte et al.

(10) Patent No.: US 10,397,251 B2
(45) Date of Patent: Aug. 27, 2019

(54) SYSTEM AND METHOD FOR SECURING AN ELECTRONIC CIRCUIT

(71) Applicant: COMMISSARIAT A L'ENERGIE ATOMIQUE ET AUX ENERGIES ALTERNATIVES, Paris (FR)

(72) Inventors: Maxime Lecomte, Aix en Provence (FR); Jacques Fournier, Simiane-Collongue (FR); Philippe Maurine, Quissac (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 180 days.

(21) Appl. No.: 15/510,425

(22) PCT Filed: Sep. 18, 2015

(86) PCT No.: PCT/EP2015/071479
§ 371 (c)(1),
(2) Date: Mar. 10, 2017

(87) PCT Pub. No.: WO2016/042144
PCT Pub. Date: Mar. 24, 2016

(65) Prior Publication Data
US 2017/0310688 A1    Oct. 26, 2017

(30) Foreign Application Priority Data
Sep. 19, 2014    (FR) ...................................... 14 58863

(51) Int. Cl.
*H04L 29/06*    (2006.01)
*H04L 9/32*    (2006.01)
*G09C 1/00*    (2006.01)

(52) U.S. Cl.
CPC ............ *H04L 63/1416* (2013.01); *G09C 1/00* (2013.01); *H04L 9/3278* (2013.01);
(Continued)

(58) Field of Classification Search
CPC ............. H04L 63/1425; H04L 63/1416; H04L 63/145; H04L 9/3278; H04L 2209/12
See application file for complete search history.

(56) References Cited

U.S. PATENT DOCUMENTS

| | | | |
|---|---|---|---|
| 7,701,244 B2 * | 4/2010 | Bartley ................... | G06F 21/75 326/38 |
| 2011/0103583 A1 * | 5/2011 | Yoon ....................... | H04L 9/302 380/255 |

(Continued)

FOREIGN PATENT DOCUMENTS

WO    2012/122309 A2    9/2012

OTHER PUBLICATIONS

Hardware Trojan Detection and Isolation Using Current Integration and Localized Current Analysis, Tehranipoor et al. (Year: 2008).*

(Continued)

*Primary Examiner* — Alexander Lagor
*Assistant Examiner* — Vu V Tran
(74) *Attorney, Agent, or Firm* — Oblon, McClelland, Maier & Neustadt, L.L.P.

(57) ABSTRACT

A system for securing an electronic circuit including: plural regions, activity of each of which may be controlled; plural sensors integrated into the electronic circuit, each sensor being sensitive to variations in manufacturing process and to provide a measurement representative of a local activity of the electronic circuit; a processing unit including an integrity verification module configured to: determine, based on the measurements provided by the sensors, and for each of the regions, a partition of the sensors between sensors affected (Continued)

and sensors not affected by an activation of the region; compare each of the partitions with a model partition to detect possible presence of a hardware Trojan horse liable to infect the electronic circuit. The system can carry out an authentication of the electronic circuit by its intrinsic physical characteristics by response to a challenge or by generation of a key.

13 Claims, 3 Drawing Sheets

(52) U.S. Cl.
CPC ........ *H04L 63/145* (2013.01); *H04L 63/1425* (2013.01); *H04L 2209/12* (2013.01)

(56) References Cited

U.S. PATENT DOCUMENTS

| | | | | |
|---|---|---|---|---|
| 2012/0159274 A1* | 6/2012 | Balakrishnan | ... | G01R 31/31703 714/732 |
| 2012/0278893 A1* | 11/2012 | Jyothi | ................ | G06F 21/566 726/24 |
| 2013/0019324 A1* | 1/2013 | Tehranipoor | ......... | H03K 3/0315 726/34 |

OTHER PUBLICATIONS

International Search Report dated Dec. 3, 2015 in PCT/EP2015/071479 filed Sep. 18, 2015.

French Search Report dated Jul. 10, 2015 in French Application 14 58863 filed Sep. 19, 2014.

Zhang, Xuehui et al., "RON: An On-Chip Ring Oscillator Network for Hardware Trojan Detection," Design, Automation & Test in Europe Conference & Exhibition (Date), Mar. 14, 2011, IEEE, XP032318342, 6 pages.

Lamech, Charles et al., "An Experimental Analysis of Power and Delay Signal-to-Noise Requirements for Detecting Trojans and Methods for Achieving the Required Detection Sensitivities," IEEE Transactions on Information Forensics and Security, vol. 6, No. 3, Sep. 2011, XP011476656, pp. 1170-1179.

Lionel, Vincent, et al., "Embedding Statistical Tests for On-Chip Dynamic Voltage and Temperature Monitoring," Design Automation Conference (DAC), 2012, 49th, ACM/EDAC/IEEE, pp. 994-999.

* cited by examiner

SYSTEM AND METHOD FOR SECURING AN ELECTRONIC CIRCUIT

TECHNICAL DOMAIN

The domain of the invention is securing electronic circuits. The invention is more particularly applicable to a verification of the integrity of an electronic circuit for detection of a possible hardware Trojan horse, and authentication of such an electronic circuit.

STATE OF PRIOR ART

Integrated circuits, particularly those used for security purposes (data encryption, encrypted communications, secure payments, etc.), are potential targets for attackers who attempt to modify their integrity, for example with the objective of provoking service denial, degrading performances or inducing a reduction of fabrication rates.

It is important to provide these circuits with countermeasures to guarantee their security, for these reasons. Until now, the security of integrated circuits was based mainly on secure packaging and measures against physical attacks (through auxiliary channels and by injection of faults) for example such as differential consumption analysis. But new needs related to authentication and verification of the integrity of electronic circuits have emerged due to phenomena of delocalised production into third party workshops and the explosion of counterfeit.

At the present time, a circuit can be authenticated using a unique secret key stored in a memory in the circuit. This key is usually written in memory during the circuit customisation phase. The key is stored in a database of a server at the same time. The server sends a binary word to the circuit that uses it to process (for example with a hash algorithm) the key stored in memory and sends the result to the server, so as to authenticate the electronic circuit. The server applies the same procedure using the key stored in the data base and compares the result obtained with the result sent by the circuit. If the two results are identical, the circuit will be authenticated. Apart from its cost (related to the customisation phase and the degree of security of the memory in which the key is stored), this authentication method also has the disadvantage that it is not perfectly robust because it can be cloned mathematically and physically.

Another authentication solution consists of measuring intrinsic unclonable characteristics of a given circuit as is done in biometry to authenticate persons. A large amount of research has been done in this field, particularly in the field of Physical Unclonable Functions (PUFs). PUF functions are hardware structures that measure the intrinsic characteristics of circuits, in other words characteristics that reveal variations in manufacturing processes recognised as being impossible to clone (both mathematically and physically) because they are sufficiently large and random to guarantee that footprints are unique. In particular, known functions include optical PUF functions based on optical properties of materials doped at random with opaque particles, PUF functions based on variations in the outside environment (for example by measuring the equivalent resistance of a circuit or the electrical properties of a special environment), PUF functions based on differences between internal propagation times of a circuit (using either arbitrators or ring oscillators), and PUF functions based on the unpredictable initial state of memory cells.

PUF functions can be used to a certain extent to verify the integrity of an integrated circuit, due to their susceptibility to physical aggressions. However, in a more global and more efficient approach to the integrity problem, it must be checked that a given circuit has not been falsified by deactivating some functions or by adding what is called a hardware Trojan horse.

A Trojan horse is composed of two parts, namely a trigger and an actuator. The trigger is a mechanism that waits and scans for conditions under which the "harmful" effect should be triggered. The triggering event can be generated externally (external signal or special physical conditions) or generated internally (internal state of the circuit, special data configuration, etc.). The trigger can also be combinational when the required condition is the result of a logical operation on several signals, or sequential when the signal is generated by a state machine. The actuator is the unwanted effect of the Trojan horse. It can be explicit when logical signals or blocks are added, deleted or deactivated directly, or implicit when the desired effect cannot be observed directly, for example thinning of some threads or information hidden in auxiliary channels of the circuit.

Detection of a hardware Trojan horse is a complex and multi-dimensional problem that depends on the type of Trojan horse (functional or parametric), its size, its distribution over the surface of the circuit and its structure.

Detection techniques are known based on fault analysis or on Automatic Test Pattern Generation (ATPG). But these techniques are limited in terms of coverage of the circuit.

Techniques are also known making use of auxiliary channels or propagation times on internal paths in a circuit. But they require relatively expensive equipment and long measurement times that are not very compatible with high volume production of integrated circuits. They also require a reference circuit (called a golden circuit), namely an implementation that is declared to be healthy (without a Trojan horse) and for which analyses of auxiliary channels or propagation times are made and used as a reference for the analysis of other circuits. However, such a golden circuit is only valid after the circuit has been fabricated and after a complete reverse engineering phase has been done on it, and this phase is very expensive in terms of time and resources.

Existing integrity verification solutions for the detection of a hardware Trojan horse are thus still at the experimental stage and are not suitable for industrial use (high volume production).

Thus, patent application US 2013/019324 A1 discloses an integrity verification technique making use of a network of ring oscillators distributed through a circuit, and a statistical data analysis for this network to determine whether a circuit is or is not healthy. More specifically, three consecutive statistical methods are used outside the circuit. The disadvantages of this technique are the need for a population of healthy circuits with the same design, and the application of the three statistical methods which is expensive in calculation time and which is not done onboard but outside the circuit.

PRESENTATION OF THE INVENTION

The purpose of this invention is to propose a solution to verify the integrity of an electronic circuit for detection of the presence of a hardware Trojan horse that could infect the circuit which solution could easily be deployed during high volume production of the circuit.

To achieve this, the invention pertains to a system for securing an electronic circuit comprising several regions, the activity of each of which may be controlled, comprising a plurality of sensors integrated into the electronic circuit, each sensor being sensitive to variations in the manufacturing process and able to provide a measurement representative of a local activity of the electronic circuit, characterized in that it comprises a processing unit comprising an integrity verification module configured so as to:

determine, on the basis of the measurements provided by the sensors, and for each of the regions, a partition of the sensors between sensors affected and sensors not affected by an activation of the region;

compare each of the partitions with a model partition so as to detect the possible presence of a hardware Trojan horse liable to infect the electronic circuit.

Each region can be dedicated to the execution of a given function, and activation of a region is then in the form of an order to execute the function associated with the region.

BRIEF DESCRIPTION OF THE DRAWINGS

Other aspects, purposes, advantages and characteristics of the invention will be better understood after reading the detailed description given below of preferred embodiments given as non-limitative examples, with reference to the appended drawings on which.

DETAILED PRESENTATION OF PARTICULAR EMBODIMENTS

Figure 1:
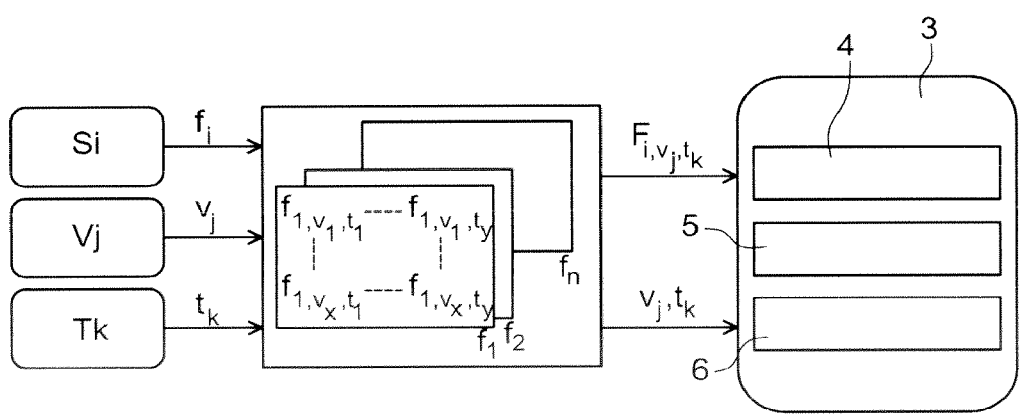
FIG. 1 is a diagram showing the system according to the invention.
Figure 2:
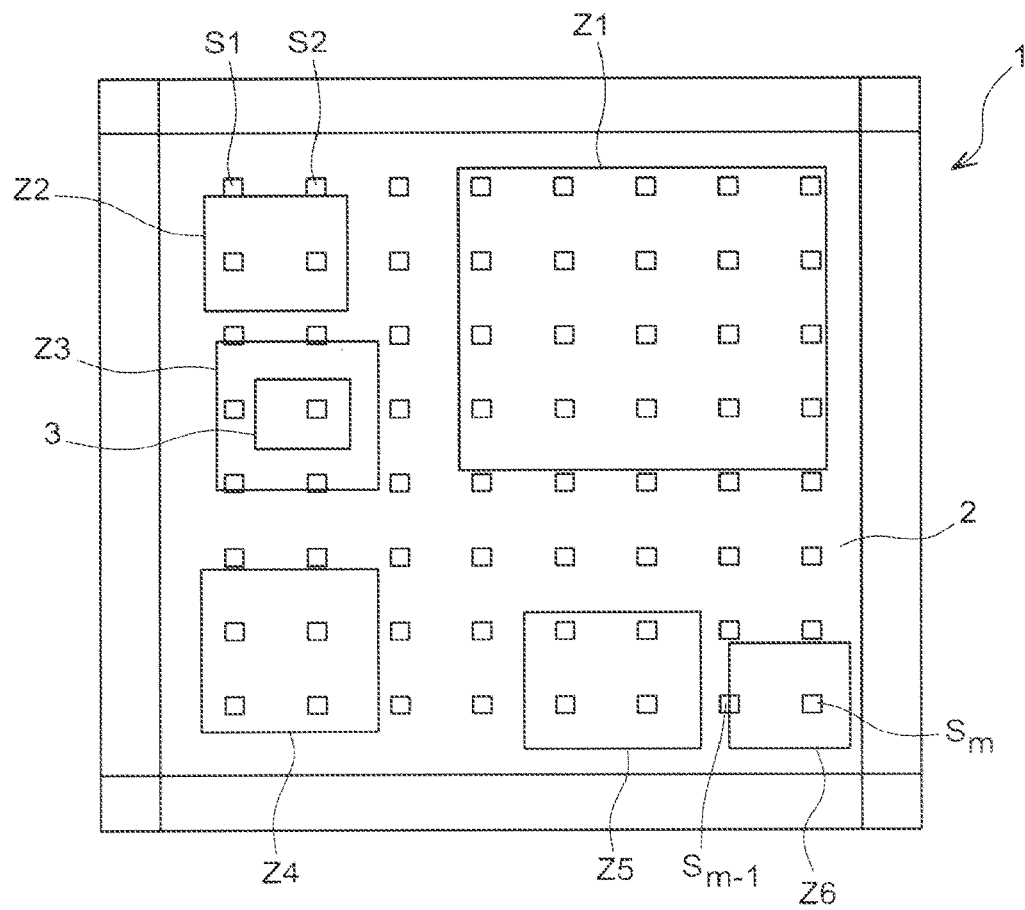
FIG. 2 represents an example spatial deployment of sensors on the surface of a circuit.

With reference to FIGS. 1 and 2, the invention relates to a system 1 for securing an electronic circuit 2, the circuit 2 comprising several regions Z1-Z6 for which activation can be controlled. For example, a region is dedicated to the execution of a function, and its activation corresponds to the execution of this function.

The system comprises a plurality of sensors Si, S1-Sm integrated into the electronic circuit, each sensor being sensitive to variations in the manufacturing process and operating conditions (particularly power supply voltage) so as to provide a measurement representative of a local activity of the electronic circuit in a zone surrounding the sensor and the local quality of the silicon. The sensors S1-Sm may or may not be distributed in the form of a regular matrix (as shown on FIG. 2 that shows a matrix of 8*8 sensors). In particular, the surface density of sensors may be varied locally (non-uniform distribution) depending on the part of the circuit to be protected.

The sensors are preferably distributed over the entire surface of the circuit but in general, the location and the number of sensors are chosen as a function of the layout of the different regions of the circuit so as to obtain measurements best representing the activity of the circuit.

Circuit 2 is composed of components integrated on a chip. The sensors are also integrated on the chip, but do not participate in performing the function(s) of the circuit.

Measurements supplied by the sensors are retrieved by an acquisition unit and processed by a processing unit 3. The processing unit can be implemented by hardware and/or software, and may or may not be transferred outside the circuit. In one embodiment shown on FIG. 2, the acquisition and processing units are integrated into the circuit, typically being placed in a space left free by the circuit (region Z3 on FIG. 2).

The sensors Si provide a numerical output value that depends on variations of the manufacturing process and the local power supply voltage. They can be controlled and may be activated or deactivated. Their output is preferably not much influenced by temperature conditions.

The sensors can preferably be configured, for example to modify their sensitivity. In the case of ring oscillator type sensors, it is thus possible to vary the count time.

One example of such sensors is a delay measurement device that uses a delay amplifier and a method of interpolating two delays to generate a numerical word, the value of which varies as a function of the measured delay and variations in the manufacturing method. The element comparing the propagation delays on two paths is called the arbitrator. The compared paths may be an existing path and a replica or two similar dedicated paths.

Figure 3:
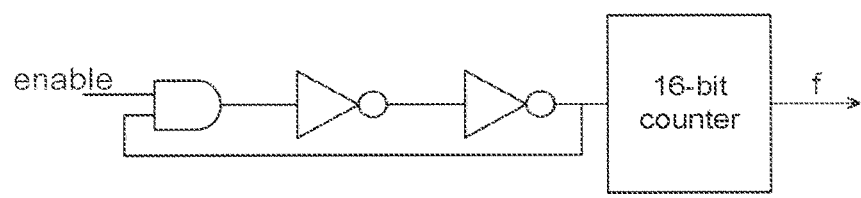
FIG. 3 represents an example of a sensor that can be used in the framework of the invention.

Another example of sensors is a ring oscillator, of which an example is illustrated in FIG. 3. In this example, the oscillator is composed of an AND gate, two inverters and a 16-bit counter. Setting the 'enable' signal to the active state provokes an oscillation at a frequency f that depends on variations in the process, the temperature and the power supply voltage. Starting from this oscillation frequency, a numerical value is generated by the counter that counts oscillations during a given time. Setting the 'enable' signal to the inactive state stabilises the system and stops oscillations.

Identification of Information Bits

The sensors preferably provide measurements in the form of numerical words each composed of a series of bits. The processing unit 3 can include an information bit identification module that identifies bits characteristic of each sensor and the variation of which remains limited between two measurements. It is thus possible to reduce the size of numeric words without losing any information content.

To achieve this, the information bits identification module is configured to eliminate invariable bits in the numerical words supplied by each sensor and bits varying at random in the different numerical words supplied by the sensor, from the series of bits supplied by each sensor.

Firstly, the information bits identification module identifies bits that are invariable in the different sensors, for example by means of a variance or entropy calculation of each bit between the sensors. The bits for which the variance (or entropy) is null can then be eliminated. For example, they may be high order bits until the first bit with a non-null variance (or entropy) between the sensors.

Secondly, the information bits identification module identifies bits that vary at random between two acquisitions from the same sensor, for example by means of a variance (or entropy) calculation of each bit between different acquisitions. The bits for which the variance (or entropy) is not null can then be eliminated. For example, they may be low order bits until the first bit with a null variance (entropy) between two acquisitions.

The information bits identification module can thus limit the size of numerical words from each sensor, to keep only those bits that contain useful information unique to each sensor. In one example embodiment, out of the 16 bits generated by a sensor, the 6 high order bits that carry invariable information between the sensors and the 6 low order bits that carry random information for the sensor, are identified for all the sensors. Therefore, this leaves 4 common information bits per sensor.

The information bits identification module is preferably placed upstream from the other modules 4, 5, 6 of the processing unit that will be described below.

Integrity Check

The processing unit 3 comprises an integrity check module 4 that detects if there is a hardware Trojan horse present in the circuit 2. More precisely, the integrity check module 4 detects and possibly locates the electrical activity of triggers or of actuators. To achieve this, it is configure to:

determine, on the basis of the measurements provided by the sensors and for each of the regions, a partition of the sensors between sensors affected and sensors not affected by an activation (making active) of the region;

compare each partition with a model partition, obtained from a reference (golden) circuit or from simulations during the circuit design, to detect if there is a hardware Trojan horse present that could infect the electronic circuit.

If the circuit is affected by a hardware Trojan horse, the trigger of the Trojan horse modifies the activity of the circuit and then the partitions of sensors. Since the partitions are not the same as the model partitions, it can be declared that the circuit is infected.

The integrity check module 4 can use the measurements provided by the sensors for different activities of the circuit. Thus, in one possible embodiment, the integrity check module 4 can be configured to:

deactivate all regions of the electronic circuit (for example by deactivating all functions of the electronic circuit) and make an acquisition of measurements supplied by the sensors;

activate each region of the electronic circuit one by one in turn (for example by ordering execution of a single one of the functions of the electronic circuit at a time), and make an acquisition of measurements supplied by the sensors;

for each region, and for each sensor, compare the measurement made by the sensor when only the region is activated with the measurement made by the sensor when all the regions are deactivated;

determine said sensor partitions from said compared measurements.

A region can be dedicated to execution of a given function and its activation (making active) can thus consist of executing this function. As a variant or not, electrical activity generators can be integrated into the circuit so as to improve the number of partitions that can be constructed, if required (for example when the circuit does not contain many function blocks). An activity generator produces a local current inrush, leading to activation of a given region of the circuit.

The different acquisitions are made for the same duration. The result of the comparison is a list of compared measurements for each successively activated region of the circuit. In the example presented above in which the sensors are ring oscillators, the list is a list of differences in oscillation frequency. This list is used to separate the population of sensors into two sets: a first set containing sensors affected by the activity in the activated region and a second set containing sensors not affected by the activity in the activated region. This separation is typically used by a partitioning algorithm, for example the k-means algorithm (standard or fuzzy), a supervised learning algorithm of the Bayesian classifier type or of the support vector machines type.

Figure 4:
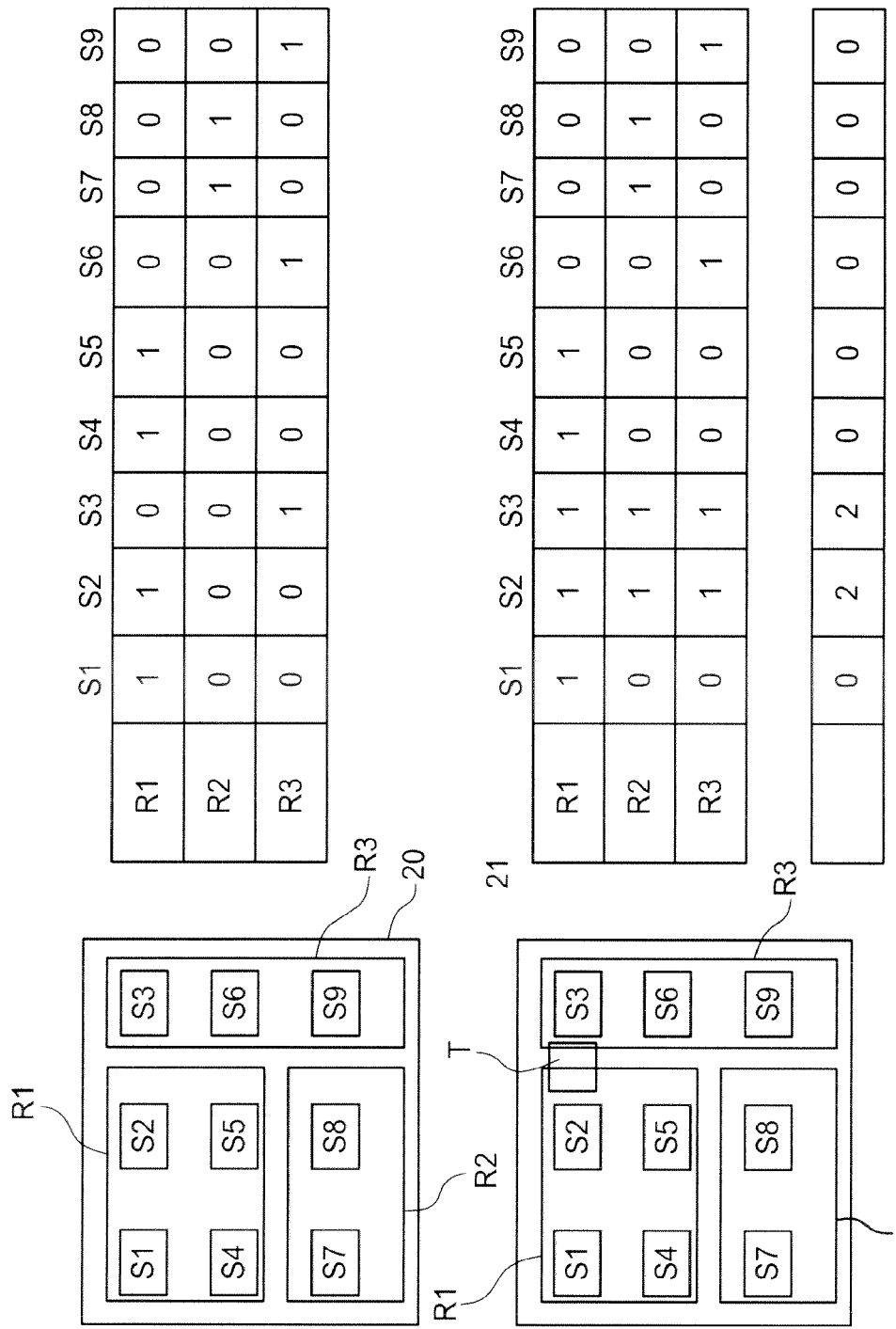
FIG. 4 is a diagram illustrating operation of an integrity verification that can be made by a system according to the invention.

FIG. 4 illustrates this integrity check for example using a healthy circuit 20 comprising three regions R1, R2 and R3 for implementation of three functions and a circuit 21 with the same design but infected by a hardware Trojan horse T. Sensors S1-S9 are distributed in matrix form on circuits 20, 21.

The table at the top right illustrates the partition of sensors between sensors that are ("1") and that are not ("0") affected by activation of the region (execution of a function in the following example), for the healthy circuit 20 and for each of the regions. Several tests can be carried out if necessary to obtain a probability of being affected. Thus, execution of the function corresponding to the region R1 and the measurements of the different sensors provides a means of determining that the sensors S1, S2, S4 and S5 are affected by execution of this function, while the others are not. Similarly, execution of the function corresponding to the region R2 and the measurements of the different sensors provides a means of determining that the sensors S7 and S8 are affected by execution of this function, while the others are not. Finally, execution of the function corresponding to the region R3 and the measurements of the different sensors provides a means of determining that the sensors S3, S6 and S9 are affected by execution of this function, while the others are not.

In other words, each line in the table illustrates the model partition for each function corresponding to regions R1-R3. In practice, the model partition is a partition derived from simulation, or a partition made from measurements of sensors integrated into a healthy reference circuit.

The tableau at the bottom right illustrates the partition of sensors between sensors affected and sensors not affected by execution of each function, for the infected circuit 21. Thus, execution of the function corresponding to the region R1 and the measurements of the different sensors provides a means of determining that the sensors S1-S5 are affected by execution of this function, while the others are not. Similarly, execution of the function corresponding to the region R2 and the measurements of the different sensors provides a means of determining that the sensors S2, S3, S7 and S8 are affected by execution of this function, while the others are not. Finally, execution of the function corresponding to the region R3 and the measurements of the different sensors provides a means of determining that the sensors S2, S3, S6 and S9 are affected by execution of this function, while the others are not.

A line by line comparison of the two tables shows that there is a different partition of the sensors and therefore it can be concluded that the circuit 21 must be infected by a hardware Trojan horse. This comparison of the partitions can be made using a similarity index, for example using the Rand index or the Jaccard index.

Moreover, in one possible embodiment, the integrity check module 4 is also configured to locate a possible hardware Trojan horse, for example by counting for each sensor and for all functions, the number of times the sensor is classified in a set different from the set in which it should appear in the model partition. When this number exceeds a threshold, the integrity check module concludes that there is a hardware Trojan horse close to the sensor. Returning to the example in FIG. 4, this number is zero for sensors S1 and S4-S9, and two for sensors S2 and S3. It is deduced that there is a Trojan horse T close to the sensors S2 and S3.

In one possible embodiment, and with reference once again to FIG. 1, the system may also include at least one detector integrated into the electronic circuit and capable of providing a measurement representative of a functional condition of the circuit. The at least one detector may include one or several voltage detectors Vj each supplying a voltage value $v_j$ (global or local) and one or several temperature detectors Tk each supplying a temperature value $t_k$ (global or local), as shown. The detectors can possibly be identical to the sensors; in particular, they may also be in the form of ring resonators for example as described in the paper by L. Vincent et al. entitled "Embedding statistical tests for on-chip dynamic voltage and temperature monitoring", Design Automation Conference (DAC), 2012, 49th ACM/EDAC/IEEE, pp 994-999.

Information output by detectors related to an operating condition of the circuit, and variations of this information from one circuit to the other, can be used constructively to authenticate the electronic circuit by challenge-response and/or by generation of a key as described below.

Authentication

In one embodiment, the processing unit 3 comprises an authentication module for the electronic circuit by a challenge-response 5 configured to calculate an unclonable physical function type response to a challenge, by means of measurements supplied by the sensors, and to supply said response accompanied by the measurement supplied by the at least one detector that is representative of an operating condition of the circuit.

The invention can thus authenticate a circuit by means of its intrinsic physical characteristics. The entity requesting authentication of the circuit sends a challenge and in return receives a unique response for each challenge, for each circuit and for each operating condition (typically voltage V and temperature T pair), condition measured by the circuit itself and embedded in the response.

The advantages compared with existing systems are a lower surface cost per response bit. The authentication is also more robust to temperature and voltage changes due to consideration of V, T operating conditions in the response. Moreover, with the system it is easy to select the number of bits used for authentication. Finally, all measurements are made on-chip which allows to accelerate procedures and reduce high volume production costs.

In one embodiment, making the challenge consists of choosing m' sensors among the m sensors. The authentication module 5 is thus configured to calculate the unclonable physical function type response from measurements made by a sub-set of said plurality of sensors.

This response can consist in particular in concatenating values generated from measurements supplied by sensors in each $$\binom{m'}{2}$$

pair of sensors among the sub-set of m' sensors in said plurality of m sensors. In particular, the value generated for a pair of sensors p, q among the sub-set of said plurality of sensors can consist of $$\Delta F_{pq} = F_{p,v_j,t_k} + F_{q,v_j,t_k} - \frac{2}{m'}\sum_{i=1}^{m'} F_{i,v_j,t_k},$$

where m' corresponds to the number of sensors in the sub-set and $F_{i,v_j,t_k}$ corresponds to the measurement supplied by one of the sensors in the sub-set for a given operating condition $v_j, t_k$ of the circuit. This operating condition is picked up by a global voltage or temperature detector or by several local detectors. In the latter case, the responses of these detectors are concatenated to be representative of the global operating condition of the circuit. Post-processing modules (for example error correction codes) operating on the response of the authentication system can be integrated (or transferred externally) to make the system more reliable.

The system may also comprise a database listing the expected response for a given challenge for each of a plurality of operating conditions of the circuit, and a comparator configured to check that the response generated by the authentication module 5 corresponds to the expected response stored in the database for an operating condition (typically a voltage, temperature pair) of the circuit corresponding to the measurement output by at least one detector accompanying the response generated by the authentication module.

The authentication procedure is thus as follows. A single phase is performed to create the database containing the different responses of the system to the different challenges, for all V, T conditions of the system. A challenge is sent to the system and the system returns voltage and temperature values and a numerical word that depends on the challenge and that is unique for each part of the circuit. The database can be viewed for the returned voltage and temperature values, and checks that the received response actually corresponds to the response stored in the data base for the given challenge and voltage and temperature conditions. The circuit is authenticated if the values correspond. Otherwise the circuit is not authenticated or modifications have been made to it.

With this technique, the number of possible challenges is $$\binom{m}{m'},$$

namely 2035800 possible challenges for each V, T condition for m=30 and m'=7. The size of the response is $$\binom{m'}{2}$$

multiplied by the number of information bits per sensor. In the case of a prototype conforming with the invention, the response size is $$\binom{7}{2}*4 = 84$$

bits when the bit identification module made it possible to reduce the number of information bits per sensor to 4. But obviously, the size and the number of challenges can be reduced if necessary.

Calculations for this challenge-response technique have shown an inter variation (between different circuits) of 48.8% and in an intra distance variation (between different executions for the same circuit) of 6.3%. These measurements, obtained in an uncontrolled environment without tattooing the voltage and temperature, are particularly satisfactory.

Generating a Key

Generation of random keys or POK (Physically Obfuscated Key) makes it possible to return a key stored permanently in the physical characteristics of a circuit. It is thus more difficult for an attacker to retrieve the key by measuring external signals (probing). Furthermore, an invasive attack of this circuit will provoke physical changes and therefore destruction of the key.

One difficulty encountered during the generation of such keys is their variability as a function of operating conditions (typically temperature and voltage). The invention discloses how this difficulty can be circumvented by having the generated key tattooed with information about operating conditions. Thus, modifications to the key due to variations in operating conditions can be taken into account. Thus, the problem of the variability of the voltage and temperature is circumvented by using it to increase security.

In one embodiment, the processing unit 3 of the system according to the invention can thus include a key generation module 6 configured to generate a key using measurements supplied by sensors and to supply said key together with the measurement output by the at least one detector. In particular, the key may consist of the concatenation of measurements $F_{i,v_j,t_k}$ output by each sensor, possibly using only the bits identified as being informative. Thus, the system outputs operating condition information and a numerical word that depends on variations in the manufacturing process, as a key. For the prototype of the invention, there are m=30 sensors for which 4 information bits are kept, which results in a 120-bit key (maximum) together with temperature and voltage information. These 120 bits can be used as a seed for the generation of longer keys, for example using a pseudo-random number generator.

Obviously, the different modules of the processing unit can be implemented alone or in combination, and either by hardware and/or software. The invention is not limited to the system as described above, but it also includes a method for securing an electronic circuit used by one and/or the other of the modules of the processing unit, and particularly a method including the following steps:

use measurements supplied by a plurality of sensors integrated into the electronic circuit, each sensor being sensitive to variations in the manufacturing process and capable of supplying a measurement representative of a local activity of the electronic circuit, to determine, for each of the functions, a partition of the sensors between sensors that are and sensors that are not affected by execution of the function;

compare said partition with a model partition so as to detect the possible presence of a hardware Trojan horse liable to infect the electronic circuit.

And the invention also includes a software implementation of such a security process, and thus in particular a computer program including code instructions for the execution of the steps in the process when said program is executed on a computer.

And it will be realised that the invention can also be applied to ASISC type circuits and to reconfigurable type circuits (for example FPGA), both in their design and in their programming method after manufacturing.

The invention claimed is:

1. A system for securing an electronic circuit comprising:
    plural regions, activity of which may be individually controlled;
    a plurality of sensors integrated into the electronic circuit, each sensor being sensitive to variations in manufacturing process and configured to provide a measurement representative of a local activity of the electronic circuit;
    a processor comprising an integrity verification circuit configured to:
        deactivate all regions of the electronic circuit and make an acquisition of the measurements supplied by the sensors;
        activate a single region of the electronic circuit one by one, and make an acquisition of the measurements supplied by the sensors;
        for each region, and for each sensor, compare the measurement made by the sensor when only the region is activated with the measurement made by the sensor when all of the regions are deactivated;
        determine, from the compared measurements, and for each of the regions, a partition of the sensors between sensors affected and sensors not affected by an activation of the region;
        compare each of the partitions with a model partition to detect possible presence of a hardware Trojan horse liable to infect the electronic circuit.

2. The system according to claim 1, wherein at least one of the regions is dedicated to execution of a function, the at least one corresponding region being activated by a command to execute the function.

3. The system according to claim 1, further comprising at least one detector integrated into the electronic circuit and configured to provide a measurement representative of a functional condition of the circuit, and
    wherein the processor further comprises a challenge-response authentication circuit for the electronic circuit configured to calculate an unclonable physical function type response to a challenge, by measurements supplied by the sensors, and to supply the response accompanied by the measurement supplied by the at least one detector.

4. The system according to claim 3, wherein the challenge-response authentication circuit is configured to calculate the unclonable physical function type response from measurements made by a sub-set of the plurality of sensors.

5. The system according to claim 4, wherein calculating the unclonable physical function type response comprises concatenating values generated from measurements supplied by sensors in each pair of sensors among the sub-set of the plurality of sensors.

6. The system according to claim 5, wherein a value generated from measurements supplied by the sensors of a pair of sensors among the sub-set of the plurality of sensors consists of $$\Delta F_{pq} = F_{p,v_j,t_k} + F_{q,v_j,t_k} - \frac{2}{m'} \sum_{i=1}^{m'} F_{i,v_j,t_k},$$

wherein m' corresponds to a number of sensors in the sub-set, p corresponding to one of the sensors of the pair and q corresponding to another sensor of the pair, and $F_{i,v_j,t_k}$ corresponds to measurement supplied by one of the sensors in the sub-set for a given operating condition $v_j$, $t_k$ of the circuit.

7. The system according to claim 3, further comprising:
    a database configured to list an expected response for a given challenge for each of a plurality of operating conditions of the circuit, and
    a comparator configured to check that the response generated by the challenge-response authentication circuit corresponds to the expected response stored in the database for an operating condition of the circuit corresponding to the measurement output by at least one detector accompanying the response generated by the challenge-response authentication circuit.

8. The system according to claim 1, further comprising at least one detector integrated into the electronic circuit and configured to provide a measurement representative of a functional condition of the circuit, and the processor further comprises a key generation circuit configured to generate a key using measurements supplied by sensors and to supply the key together with the measurement output by the at least one detector.

9. The system according to claim 8, wherein generating the key concatenates measurements provided by each of the sensors.

10. The system according to claim 1, wherein the sensors provide measurements in a form of numerical words of a series of bits, and the processor further comprises an information bits identification circuit configured to eliminate, from the series of bits supplied by a sensor, invariable bits in the numerical words supplied by each sensor and bits varying at random in the different numerical words supplied by the sensor.

11. The system according to claim 1, wherein the processor is integrated into the electronic circuit.

12. A method for securing an electronic circuit including plural regions, activity of which can be individually controlled an a plurality of sensors integrated into the electronic circuit, each sensor being sensitive to variations in manufacturing process and being configured to supply a measurement representative of a local activity of the electronic circuit, the method comprising:
  deactivating all regions of the electronic circuit and making an acquisition of the measurements supplied by the sensors;
  activating a single region of the electronic circuit one by one, and making an acquisition of the measurements supplied by the sensors;
  for each region, and for each sensor, comparing the measurement made by the sensor when only the region is activated with the measurement made by the sensor when all of the regions are deactivated;
  determining, from the compared measurements, for each region, a partition of the sensors between sensors that are affected by activation of the region and sensors that are not affected by activation of the region;
  comparing each of the partitions with a model partition to detect possible presence of a hardware Trojan horse liable to infect the electronic circuit.

13. A non-transitory computer readable medium including a computer program containing computer code instructions for execution of the method according to claim 12 when the program is executed on a computer.

* * * * *